UNITED STATES PATENT OFFICE.

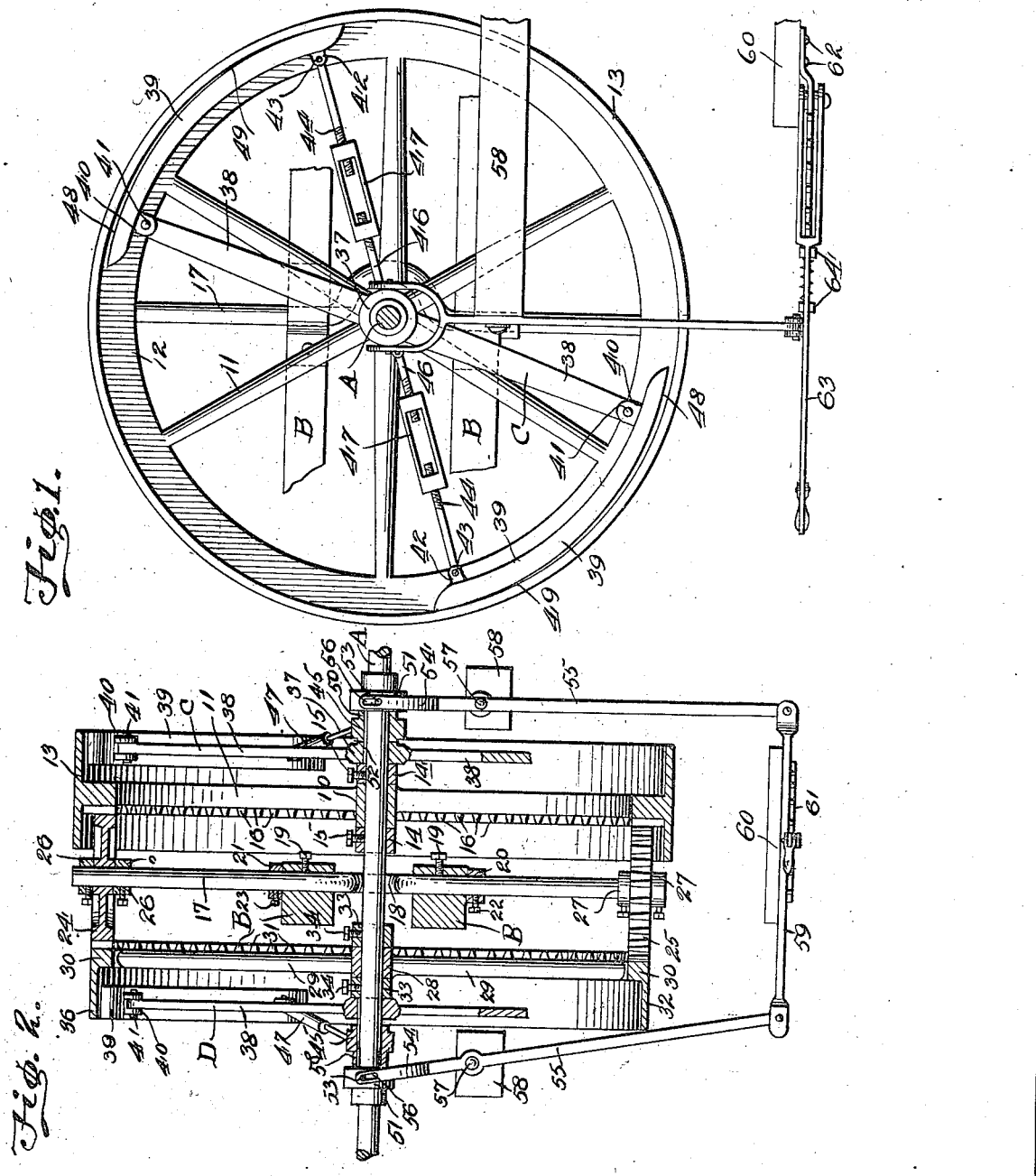

ROBERT A. HOLMES, OF EDEN, IDAHO.

REVERSING-GEAR MECHANISM.

1,195,470.

Specification of Letters Patent. Patented Aug. 22, 1916.

Application filed May 5, 1915. Serial No. 26,044.

*To all whom it may concern:*

Be it known that I, ROBERT A. HOLMES, a citizen of the United States, residing at Eden, in the county of Minidoka and State of Idaho, have invented certain new and useful Improvements in Reversing-Gear Mechanism, of which the following is a specification.

This invention relates to improvements in reversing gear mechanism.

The principal object of my invention is to provide means for reversing the direction of rotation of a pulley, fly wheel or similar element operating in conjunction with a continuously driven shaft, in order to effectually and positively control such mechanism as may be driven thereby, and in carrying this main object into effect, other servient objects are; first, to provide a simple arrangement of parts that may be quickly and positively operated to cause the reversal of the driven element, during the single stroke of the operating lever, in a manner that will obviate breakage or injury to the driven mechanism; secondly clutch means to cause the rotation of the driven element in one direction and similar mechanism for causing the rotation of said element in an opposite direction; and, thirdly, efficient means for controlling the said clutches, to move either into an operative position, and move both of said clutches into an inoperative position, during the single stroke of a common manipulating lever means.

The above and other objects which will become apparent are accomplished by such means as are shown in their preferred form in the accompanying drawings, described in the following specification and then more specifically pointed out in the appended claims.

In the accompanying drawings wherein is illustrated the preferred form of my invention, and like numerals designate like parts throughout the several views: Figure 1 is a diagrammatic view of my invention; Fig. 2 is a longitudinal sectional view showing parts also in elevation.

In the drawings, A denotes the shaft element which is understood to be continuously driven, in a desired direction, by any suitable propelling mechanism, such for instance as an internal combustion engine or a dynamo. It is to be understood therefore that this shaft may be directly driven from such operating mechanism and my invention employed in conjunction with the fly wheel or driving pulley arranged thereon, or that this shaft may be one of a series that are continuously driven and my invention employed in conjunction with a driving pulley carried thereby. It is to be further understood that the driven element hereinafter referred to covers the term of a pulley or fly wheel, and that the specific application of my invention is not limited to either.

The driven element mentioned, consists of a hub portion 10 from which radiate at suitable diametric points, spoke elements 11. The respective outer extremities of the spoke elements merge into an annular rim portion 12, which is provided to support a transverse circumferential flange 13. It will be noted that the component parts of the driven element, as illustrated, are formed integral in order that the entire structure may be cast.

The hub portion 10 of the driven element is arranged about the shaft A in order that the element may be held idly thereon.

In order to limit the longitudinal movement of the driven element in relation to the shaft A, suitable adjustable boxings 14 are arranged on the latter and engage the hub portion 10 as shown, the fastening elements 15 being designed to coöperate with the boxings in order that they may be keyed to the shaft.

Again referring to the driven element, it will be noted that a series of crown teeth 16 are arranged on one annular face of the rim portion 12. The teeth are arranged in this manner in order to co-mesh with other toothed gear elements, in order that the driven element may be rotated in a reverse direction to the direction of rotation of the shaft A through the medium of a second driven element (hereinafter fully described).

Suitable supports being arranged in proximity to the apparatus, a shaft 17 is provided, and arranged to extend through the respective supports, an intermediate portion being off-set as at 18 to allow the accommodation of the driving shaft A. Fastening elements 19 are journaled in each of the supports B in order to assure the rigidity of the shaft 17. Other collars 20 and 21, carrying fastening elements 22 and 23 are employed to coöperate with the fastening members 19 and designed to obviate the danger of longitudinal displacement, or if the case may be vertical displacement of the shaft 17.

Crown gears 24 and 25 are loosely mounted on the shaft 17 adjacent the respective extremities thereof and at certain positions whereby they co-mesh with the teeth 16 on the driven element, at substantially diametrically opposite points. Adjustable boxings 26 and 27 are arranged in proximity to the respective crown gears 24 and 25 for the purpose of preventing displacement thereof, and holding the same at a predetermined position during the operation of the device.

In consistence with the foregoing, a second driven element is provided which consists of a hub portion 28, from the periphery of which project spoke elements 29, the latter in turn merging into an annular rim portion. That face of the rim 30 opposite the first driven element is provided with a multiplicity of crown gear teeth 31 which inter-mesh with the similarly formed teeth on the gears 24 and 25. A circumferential flange 32 projects from the opposite side of the rim portion 30 flush with the perimetal surface of the latter and serves the purpose that will presently appear. Suitable boxings 33 carrying fastening members 34 are arranged on the driving shaft A in order to prevent the longitudinal displacement or movement of the second driven element. These boxings 33 are of substantially the same construction as the ones hereinbefore referred to.

In view of the fact that each of the driven elements referred to is loosely mounted on the driving shaft, suitable clutch mechanism has been employed, which is keyed to the driving shaft in order to impart a revoluble movement thereto. It is to be understood that the clutch mechanism hereinafter described is shown in its preferred embodiment and that the construction of the same may be varied to that extent which the appended claims may import. A hub structure 37 is arranged on the driving shaft A at a point adjacent the hub 10, from which radiate at preferably diametrical points, arms 38.

In order to engage the inner periphery of the flange 13 in the manner presently described, complemental shoes 39 are employed, which carry spaced apart ears 40 adjacent one end thereof for connection with the outer ends of the arms 38 through the medium of suitable fastening members 41. Other spaced apart ears 42 are arranged on the shoes 39, which have pivotally connected thereto as shown at 43 a parallel exteriorly screw threaded rod 44. A collar 45 is arranged on the shaft A in proximity to the hub 37, this lower collar pivotally supporting the rods 46 that are complemental to the rods 44, turn buckles 47 connecting the respective spaced apart free ends thereof in order that the shoes may be adjusted to various positions. That portion of the shoes 39 adjacent the ears 40 is constricted as at 48, in order that this portion will be spaced from the inner periphery of the flange 13, while the enlarged portion, or wearing surfaces 49 may be moved into engagement therewith in the manner hereinafter described.

A sleeve structure 50 projects from the outer face of the collar 45 and accommodates a suitable non-revoluble casing 51, the latter being employed to shift the sleeve 50 and adjacent collar to different positions, in order to move the engaging surface of the shoes 39 into and out of engagement with the respective inner periphery of the flange 13. This means however, will be described at length hereinafter.

Upon reference to Fig. 2, it will be recognized that a longitudinal rib 52 is provided on the driving shaft A which operates in suitable alined grooves in the hub 37 and the collar and sleeve 45 and 50 respectively, in order to key these elements whereby they will be rotated simultaneously with the shaft A. While means have been provided for securing the hub 37 rigid to the shaft and preventing longitudinal movement thereof, it will be recognized that the collar and sleeve, 45 and 50 respectively may be moved longitudinally of the shaft, in order to operate the respective engaging portions of the shoes 39. When in the position shown in Fig. 2 the engaging portions of the respective shoes will be in engagement with the inner periphery of the flange 13 consequently this driven element will be rotated in the direction of the rotation of the shaft A. If the collar and sleeve are moved longitudinally of the shaft, it will be seen that the engaging surfaces of the shoes may be drawn out of engagement with the adjacent portions of the flange consequently rendering the driven element idle.

A second clutch mechanism similar to the one above described is employed in conjunction with the second driven element and the adjacent portion of the shaft A, however as this mechanism is complementary, the description of the one in conjunction with the first driven element will suffice for both. The first clutch mechanism will be hereinafter referred to as clutch C while the second clutch mechanism which is engageable with the second driven element will be termed as clutch D.

The respective casings 51 are provided with lugs 53, which are receivable within suitable slotted projections 54 arranged at one end of the arms 55, the lugs operating within the slots 56 as shown in Fig. 2. The arms 55 are pivoted intermediate their ends as shown at 57 on suitable supports 58, the latter being arranged in proximity to the apparatus. In order that the arms 55 may be operated simultaneously, their rear ends are connected as by a member 59 the latter operating in proximity to a suitable supporting structure 60 whereby it may be engaged and held at suitable adjusted positions in the manner presently described. A tooth segment 61 is secured to the structure 60 as at 62, the same co-acting with an operating lever 63 carrying an engaging pawl 64 as shown.

In the operation of my invention, assuming that the parts are in the position shown, it will be understood that the driving shaft may be rotated in either direction. The clutch C being in an operative position, will cause the rotation of the adjacet driven element in a direction similar to the rotation of the shaft. The gears 24 and 25 are consequently rotated in different directions so as to cause the rotation of the second driven element, however in view of the inoperativeness of the clutch D, this element will be rotated in a direction opposite to the rotation of the shaft A. If it is desired, to reverse the movement of the first driven element, the position of the arms 55 is reversed through the instrumentality of the lever 65 which will cause the clutch C to be drawn to an inoperative position, after which the clutch D will engage the inner periphery of the second element. As soon as this operation occurs, the second driven element will be rotated in a direction similar to the rotation of the shaft A, and will consequently cause the rotation of the gears 24 and 25 in opposite directions. The gears 24 and 25 being in mesh with the teeth on the first element will cause the latter to be rotated in a direction that is reverse to the direction of rotation of the shaft A. It will be recognized that the respective clutches C and D are operated during the single stroke lever 63, and that each of the clutches may be moved to an inoperative position and the driven element rendered idle during this movement if it is so desired.

In reducing my invention to practice, I find that the form referred to herein as the most practical and preferred embodiment is the most efficient; yet realizing that certain conditions will necessarily vary in concurrence with the adoption of my device, I desire to emphasize the fact that various minor changes in details of construction and proportion of parts may be resorted to when required, without sacrificing any of the advantages of my invention as defined in the appended claims.

Having thus fully described my invention, what I claim as new and desired to secure by Letters Patent is:

1. In reversing mechanism the combination with a shaft, of a pulley loosely mounted on said shaft having laterally extending flanges, a clutch wheel loosely mounted on said shaft in spaced relation to said pulley, said clutch wheel also having a lateral flange, a non-rotatable shaft arranged between said pulley and said clutch wheel, means carried by said non-rotatable shaft to cause opposite rotation of said pulley and said clutch wheel, arms fixed to said shaft in proximity to said pulley and said clutch wheel, segmental shoes pivotally connected at one end to said arms to normally be out of engagement with said flanges, collars splined to said shaft, means carried by said collars and having connection with said shoes adjacent their other end whereby upon movement of said collars said shoes may be drawn into or out of engagement with said flanges, and common means to shift said collars, as and for the purpose specified.

2. In reversing mechanism, the combination with a shaft, of a pulley loosely mounted thereon, laterally projecting flanges on said pulley, rack teeth on said pulley adjacent its perimetal edge, a non-rotatable shaft arranged adjacent said pulley, gear wheels on said shaft adjacent its respective ends in co-meshing engagement with the rack teeth of said pulley, a clutch wheel loosely mounted on said shaft, rack teeth on said clutch wheel having co-meshing engagement with said gear wheels whereby said pulley and said clutch wheel may be rotated in opposite directions, a lateral flange on said clutch wheel, collars fixed on said shaft in proximity to said pulley and said clutch wheel, oppositely projecting arms carried by said collars, segmental shoes pivotally connected adjacent one end to the outer end of said arms to be normally out of engagement with said flanges, other collars splined on said shaft and movable longitudinally with respect thereto, means connecting said last mentioned collars and said segmental shoes whereby upon movement of said last mentioned collars, one end of said segmental shoes may be moved into or out of engagement with said flanges, and common means including an operating lever to shift said last mentioned collars to cause the reversal of said pulley, as and for the purpose specified.

In testimony whereof I affix my signature in presence of two witnesses.

ROBERT A. HOLMES.

Witnesses:
W. S. DUNN,
E. L. SKELTON.